(12) United States Patent
Hansen et al.

(10) Patent No.: US 7,031,089 B2
(45) Date of Patent: Apr. 18, 2006

(54) TAPE HEAD ASSEMBLY

(75) Inventors: Lawrence A. Hansen, Meridian, ID (US); Ralph F. Simmons, Jr., Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 117 days.

(21) Appl. No.: 10/737,956

(22) Filed: Dec. 17, 2003

(65) Prior Publication Data

US 2005/0134991 A1 Jun. 23, 2005

(51) Int. Cl.
*G11B 15/12* (2006.01)
*G11B 5/09* (2006.01)
*G11B 5/03* (2006.01)
*G11B 5/02* (2006.01)

(52) U.S. Cl. .................. 360/61; 360/46; 360/67; 360/66

(58) Field of Classification Search ................ 360/22, 360/63, 61, 62, 66, 55, 46, 67, 68
See application file for complete search history.

(56) References Cited

U.S. PATENT DOCUMENTS

| 4,616,279 A | 10/1986 | Poorman |
| 5,027,245 A * | 6/1991 | Nagata et al. ............... 360/121 |
| 5,142,422 A | 8/1992 | Zook et al. |
| 5,287,478 A | 2/1994 | Johnston et al. |
| 5,406,425 A | 4/1995 | Johnston et al. |
| 5,679,942 A | 10/1997 | Toyama |
| 5,862,014 A * | 1/1999 | Nute ........................... 360/291 |
| 6,018,444 A | 1/2000 | Beck et al. |
| 6,055,117 A | 4/2000 | Hansen et al. |
| 6,078,483 A | 6/2000 | Anderson |
| 6,388,836 B1 | 5/2002 | Anderson et al. |
| 6,471,415 B1 | 10/2002 | Poorman |
| 6,508,750 B1 | 1/2003 | Poorman |

FOREIGN PATENT DOCUMENTS

| EP | 0 012 264 | 6/1980 |
| EP | 0 789 352 | 8/1997 |
| GB | 1 425 400 | 2/1976 |

OTHER PUBLICATIONS

IBM, "IBM Introduces New Enterprise-Class Storage Solutions for Medium-Sized Companies," pp. 1-3, printed from http://www.storage.ibm.com (Feb. 18, 2003).
IBM, "IBM TotalStorage Ultrium External Tape Drive 3580 featuring Ultrium 2 drives," 2 pages (Jan. 2003).
IBM, "Ultrium External Tape Drive," 2 pages (Sep. 2002).
IBM, "Ultrium LTO," pp. 1-3, printed from http://www.storage.ibm.com (1998).

(Continued)

*Primary Examiner*—David Hudspeth
*Assistant Examiner*—Dan I Davidson

(57) ABSTRACT

A tape head assembly comprises a transducer head having plural arrays of transducing elements, the transducing elements comprising at least one of write elements and read elements. The tape head assembly further comprises a set of conditioning elements, the conditioning elements comprising at least one of write drivers and read amplifiers. Multiplexing circuitry selectively couples the conditioning elements to one of the plural arrays of transducing elements.

19 Claims, 4 Drawing Sheets

OTHER PUBLICATIONS

Hewlett-Packard, "HP Ultrium Tape Products Range," 10 pages (1999).

Seagate, "Linear, Tape-Open (LTO) Technology," pp. 1-5 (1998).

* cited by examiner

TAPE HEAD ASSEMBLY

BACKGROUND

A widely used storage medium for storing information is storage tape, such as magnetic tape. Storage tapes can be mounted in various types of tape cassettes or cartridges. One type of tape cassette or cartridge is a two-reel or two-spindle cassette or cartridge in which the tape is housed entirely within the cassette or cartridge. One end of the tape is attached to a first reel, while another end of the tape is attached to a second reel. The cassette or cartridge is loaded into a tape drive, which includes a tape head assembly that engages the tape to read data from or record data to the tape as the tape is wound from one reel to the other in the tape cassette or cartridge.

Alternatively, a single-reel or single-spindle tape cartridge can be used in which the cartridge has one reel or spindle. In a single-reel design, the source reel is located in the tape cartridge, but a take-up reel is located outside the cartridge in the tape drive. When the single-reel cartridge is loaded into the tape drive, an end of the tape is removed from the cartridge and loaded onto the take-up reel of the tape drive.

To achieve increased data transfer rates, tape drives employ tape head assemblies having multiple channels of read and write elements. A write element of the tape head includes a thin-film inductive element for recording data, while the read element is a magnetically sensitive thin-film resistive element for detecting data bits. Multiple channels of write elements are capable of recording to multiple data tracks of the tape simultaneously, and multi-channel read heads are capable of reading from multiple data tracks of the tape simultaneously. In one example, a tape head assembly can have 16 channels, with 8 channels for recording to or reading data from the tape as the tape moves in a first direction, and 8 channels for recording to or reading from the tape as the tape moves in the opposite direction. In conventional tape drives, each channel is associated with a dedicated write driver and read amplifier. If a tape head assembly includes a large number of channels, then the amount of circuitry (write drivers and read amplifiers) required to perform read and write tasks can be quite large.

Another issue associated with tape head assemblies is the presence of electrical interference or crosstalk between write and read elements, as well as between the write and read signal paths or traces electrically connected to respective write and read elements. Crosstalk between write elements (and traces) and read elements (and traces) typically result from the presence of relatively high currents in the write elements and write traces when recording data to tape. Also, reduction in the size of tape head assemblies has further increased the likelihood of crosstalk between write and read elements (and traces) that are placed in closer proximity to each other.

DETAILED DESCRIPTION

Figure 1:
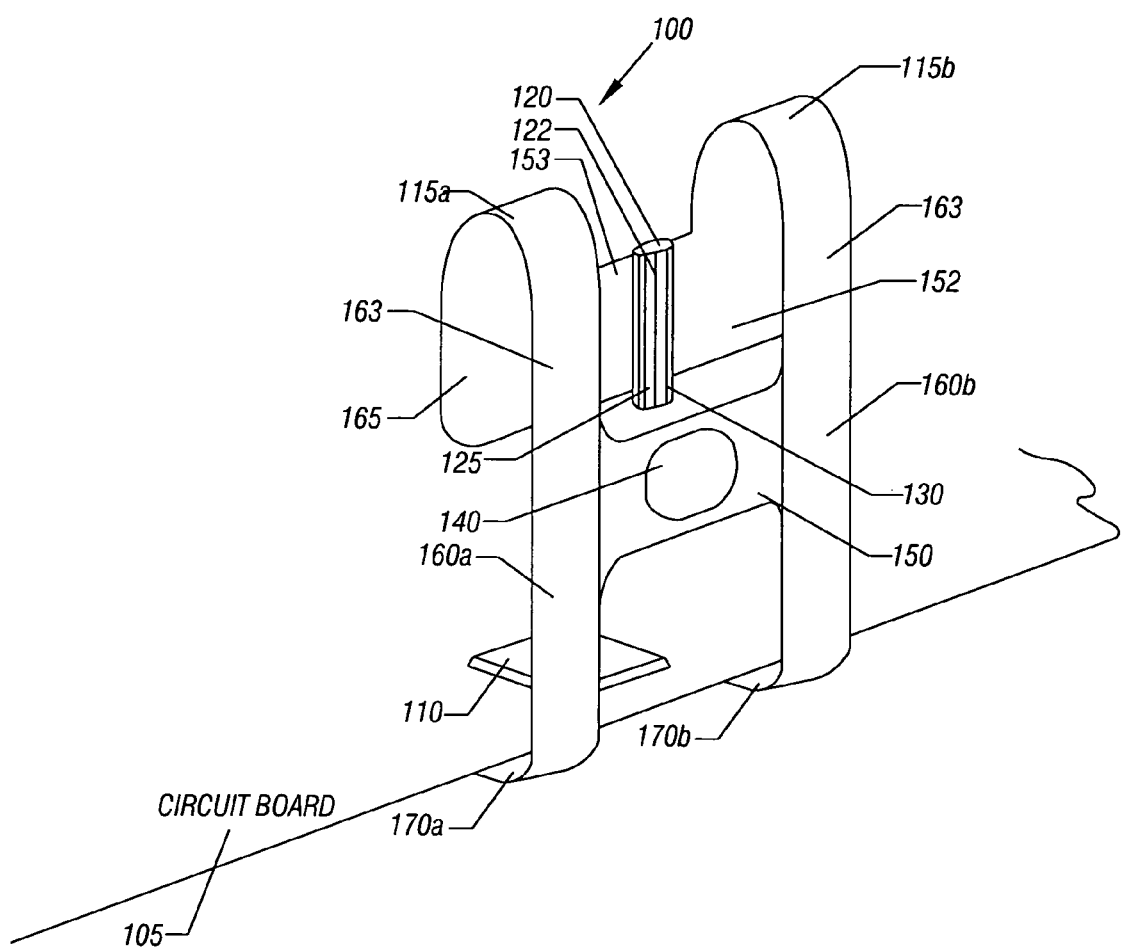
FIG. 1 is a perspective view of a tape head assembly, according to one example implementation.
Figure 4:
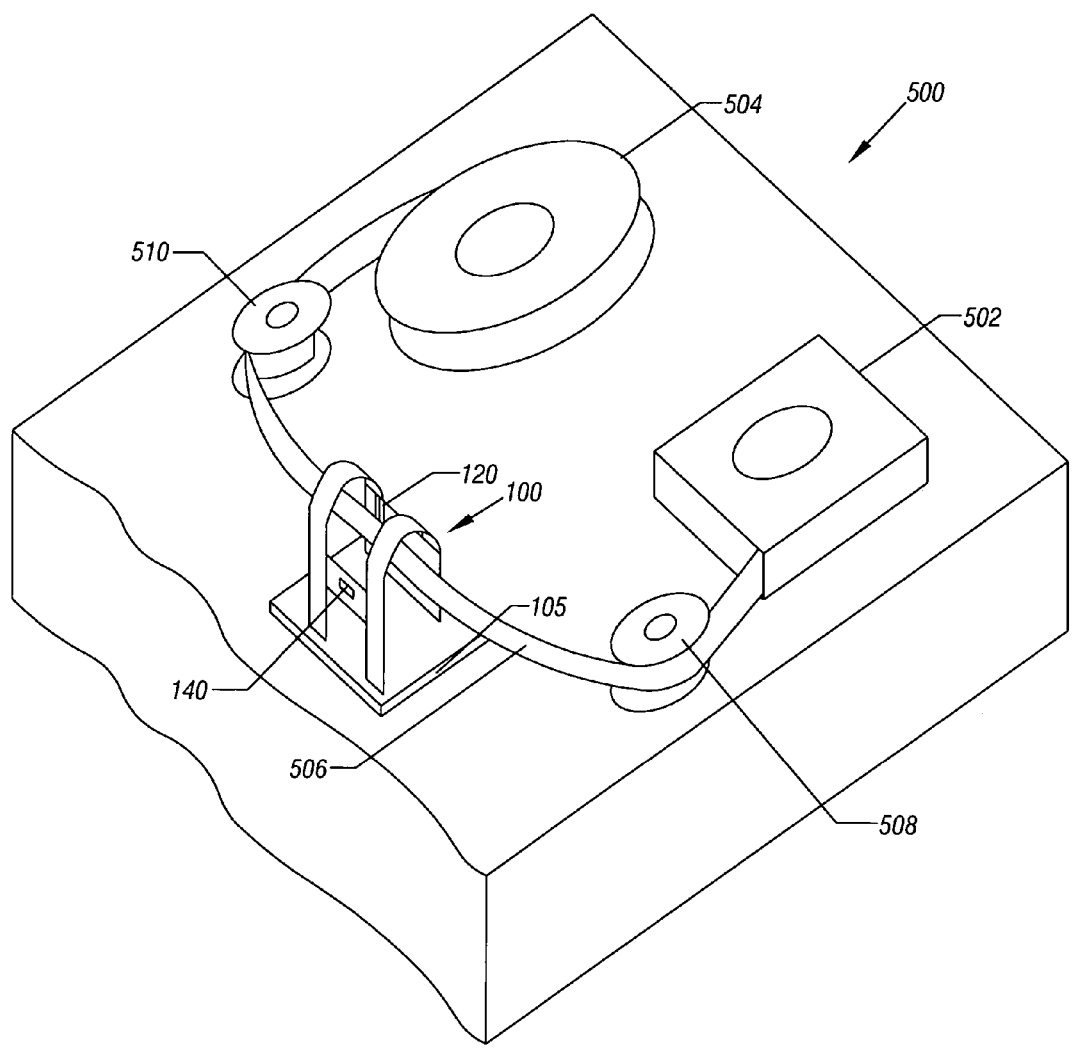
FIG. 4 illustrates an example tape drive that includes the tape head assembly of FIG. 1.

FIG. 1 shows a tape head assembly 100 according to an embodiment that is used in a tape drive (shown in FIG. 4). The tape head assembly 100 includes a transducer head 120, write circuitry 140, and read circuitry 110. The transducer head 120 has a first array 125 of read elements, write elements, and servo elements, and a second array 130 of read elements, write elements, and servo elements. The first array 125 is located on one side of a center portion 122 of the transducer head 120, while the second array 130 is located on the other side of the center portion 122. The transducer head 120 is referred to as a two-array transducer head.

Each of the arrays 125 and 130 includes a number of write elements, read elements and servo elements (not shown). According to one example implementation, in a 32-channel tape head assembly, each of the first array 125 and second array 130 includes 16 write elements, 16 read elements and two servo elements. In other implementations, the arrays 125 and 130 can include a larger or smaller number of write elements, read elements, and servo elements.

In one embodiment, the read elements in the transducer head 120 are magnetoresistive (MR) read elements for reading data from tape, and the write elements in the transducer head 120 are inductive write elements for recording data onto tape. The servo elements in transducer head 120 can also be MR elements that read servo information on the tape to align transducer head elements to correct positions for reading.

The write circuitry 140 generates write signals that are provided to the write elements of the transducer head 120 for writing data to tape passing over the transducer head 120. The read circuitry 110 includes circuitry to process read signals from the read elements and servo signals from the servo elements on the transducer head 120 that result from reading data on the tape passing over transducer head 120.

In accordance with some embodiments of the invention, as depicted in FIG. 1, the write circuitry 140 and read circuitry 110 are implemented as separate units, such as in separate integrated circuit (IC) chips. By implementing the write circuitry 140 and read circuitry 110 as separate units, the write circuitry 140 can be placed in closer proximity to the transducer head 120 than the read circuitry 110.

The read circuitry 110 is mounted on a circuit board 105 in the tape drive. The tape head assembly 100 includes an interconnect structure 163 having electrically conductive read traces to electrically connect the read circuitry 110 to the read elements of the transducer head 120. In one embodiment, the interconnect structure 163 includes a flexible circuit.

The interconnect structure 163 has two spaced apart legs 160a and 160b that are bent at their upper ends (to form rolling loops 115a and 115b). The flexible circuit 163 also includes a flat rear section 152 that is integrally attached to the rolling loops 115a and 115b. The transducer head 120 is mounted on the rear section 152 of the interconnect structure 163.

The read traces in the interconnect structure 163 extend from the transducer head 120 through the rear section 152, rolling loops 115a and 115b, and legs 160a and 160b to the circuit board 105. The interconnect structure 163 also has traces to electrically connect the transducer head servo elements to the read circuitry 110.

As noted above, the write circuitry 140 is placed in closer proximity to the transducer head 120 than the read circuitry 110. Instead of being mounted on the circuit board 105, the write circuitry 140 is mounted on an intermediate portion 150 of the interconnect structure 163. A stiffening structure is provided in the intermediate portion 152 to enable mounting of the write circuitry 140.

The intermediate portion 150 extends between the legs 160a, 160b. Collectively, the portion 150 and legs 160a and 160b form a generally H-shaped structure. Electrically conductive write traces extend through the intermediate portion 150, legs 160a and 160b, rolling loops 115a and 115b, and rear section 152 to electrically connect the write circuitry 140 to the transducer head write elements.

By placing the write circuitry 140 in closer proximity to the transducer head 120, the lengths of write traces are reduced. As a result, the inductance seen by each write driver in the write circuitry 140 is reduced so that faster switching of write signals (write data and write control signals) can occur to achieve higher write speeds. In addition, placing the write drivers closer to the transducer head write elements reduces the load that has to be driven by the write drivers. By reducing the load, the current that has to be driven by the write drivers can also be reduced. Reducing the current driven by the write drivers helps to reduce crosstalk between the transducer head write elements and read elements. Also, the reduced lengths of the write traces from the write circuitry 140 to the transducer head 120 means that less crosstalk occurs from the write traces to the read traces. Reduction of crosstalk enhances the accuracy of write and read operations in the tape drive.

In other embodiments, if adequate space exists, the read circuitry 110 can also be mounted on some part of the interconnect structure 163.

Data storage tape from a cartridge (not shown in FIG. 1) is passed through a space between the rear section 152 and legs 160a, 160b of the interconnect structure 163. If the tape is moving from left to right in FIG. 1, the two servo elements on the second array 130 of transducer head 120 operate to align read elements in the second array 130 to the correct position with respect to the tape for reading. On the other hand, if the tape is moving from right to left in FIG. 1, the two servo elements on the first array 125 of transducer head 120 operate to align read elements in the first array 125 with respect to the tape.

In addition, according to some embodiments of the invention, the number of components in the write circuitry 140 and the read circuitry 110 is reduced as compared to conventional write circuitry and read circuitry. The reduction of the number of components is accomplished by using a multiplexing arrangement in which the read circuitry 110 is able to multiplex between read signals from the two arrays 125 and 130 of read elements at the transducer head 120. As a result, each read amplifier in the read circuitry 110 is able to selectively process read signals from two read elements (one read signal from a read element in the first array 125 and the other read signal from a read element the second array 130).

Similarly, the write circuitry 140 is also able to multiplex between write signals driven to the two arrays 125 and 130 of write elements in the transducer head 120. As a result, each write driver in the write driver circuitry 140 is able to selectively drive write signals to two write elements (one write signal to a write element in the first array 125 and the other write signal to a write element in the second array 130). By performing the multiplexing described above, the number of write drivers used in the write circuitry 140 and the number of read amplifiers used in the read circuitry 110 is reduced in half.

Figure 2:
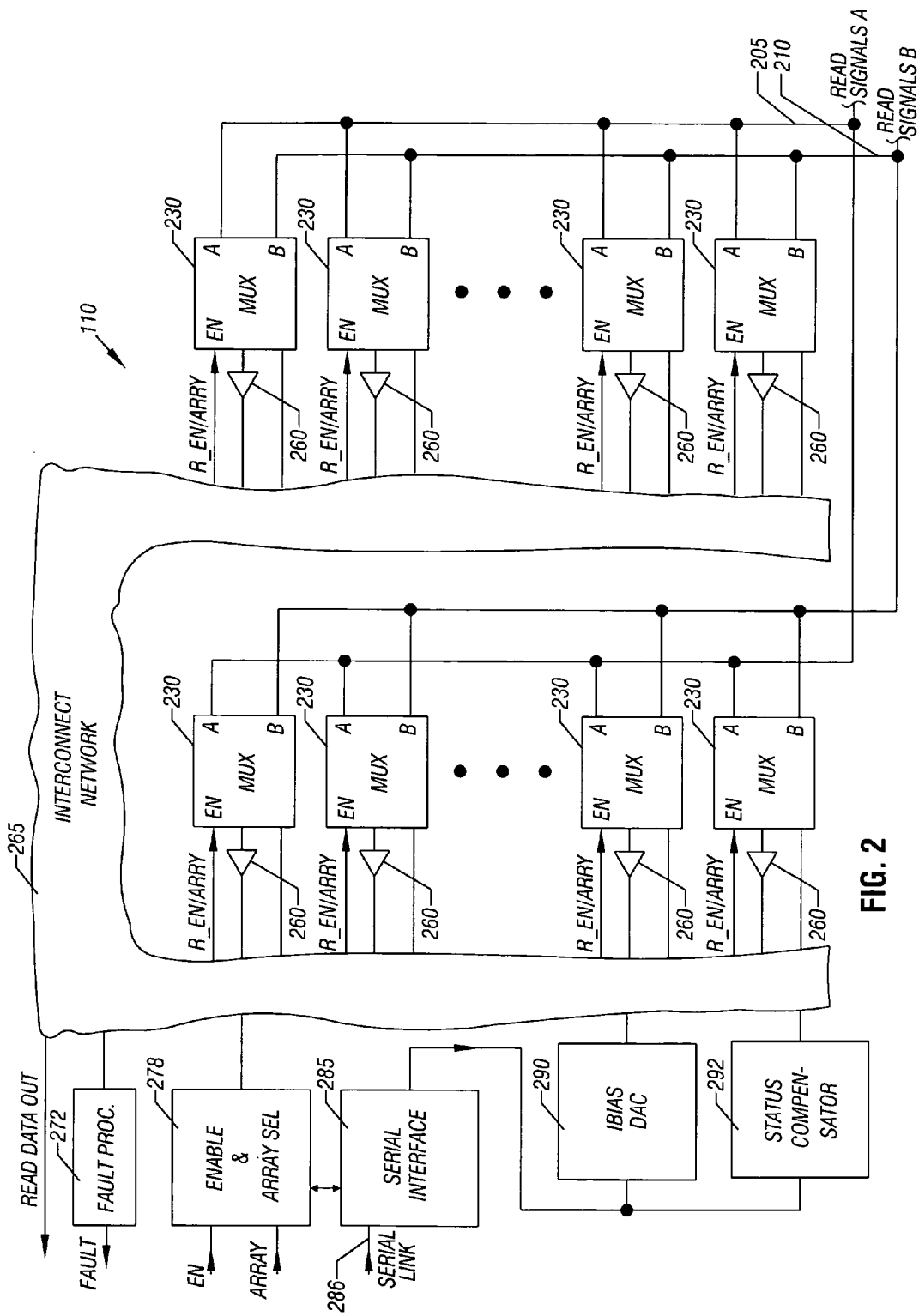
FIG. 2 is a schematic diagram of circuitry for processing read signals from read elements on a transducer head in the tape head assembly, according to one embodiment.

FIG. 2 depicts an example arrangement of the read circuitry 110 for a 32-channel tape head assembly in which 16 read/write elements are provided in the first array 125 and 16 read/write elements are provided in the second array 130. During read operation, the read circuitry 110 receives 16 read signals 205 from the 16 read elements of the first array 125 (referred to as "array A") when the tape travels in a first direction (moving from left to right in FIG. 1). For the tape traveling in the opposite direction, 16 read signals 210 from the second array 130 (referred to as "array B") are received by the read circuitry 110. Thus, depending upon the travel direction of the tape, either read signals 205 or read signals 210 are received from read elements of array A or array B, respectively. Each of the read signals 205 and 210 may be a differential signal that propagates over a respective pairs of wires or signal lines. In other embodiments, instead of differential read signals, single-ended read signals can be employed.

Sixteen read multiplexers 230 are provided to receive the read signals 205 and 210 from array A and array B. Each multiplexer 230 includes an A input and a B input, with the A input receiving a read signal 205 from array A, and the B input receiving a read signal 210 from array B. The multiplexer 230 selects one of the read signals 205 and 210 based on the state of a control signal R_EN/ARRY received over an interconnect network 265.

The R_EN/ARRY signal is generated by an enable and array select logic 278. A first state of the R_EN/ARRY signal causes selection of read signals 205 by the multiplexers 230, while a second state of the R_EN/ARRY signal causes selection of the read signals 210. An EN input signal to the enable and array select logic 278 is set to enable the reading of data on the tape. An ARRAY signal that is also an input to the logic 278 controls the state of the R_EN/ARRY signal when EN is active.

The 16 output signals from the multiplexers 230 are amplified by 16 respective amplifiers 260. The amplifiers 260 also perform filtering of the read signals output by the multiplexers 230. The amplified and filtered signals from the amplifiers 260 are transmitted through the interconnect network 265 and provided as read data output to a system controller or processor (not shown) on the circuit board 105 (FIG. 1). In one implementation, the interconnect network 265 includes transmission lines on the circuit board 105.

The read circuitry 110 also includes a serial interface 285 for receiving serial data and instructions over a serial link 286 connected to the system controller or processor. Instead of the serial interface 285, a different type of interface can be used in another embodiment. The serial interface 285 enables the tape drive to perform configuration and other tasks with respect to the tape head assembly 120. Such tasks include setting the bias current of the read elements, reporting open circuit or short circuit faults detected by a fault processor 272, and so forth.

An Ibias digital-to-analog converter (Ibias DAC) 290 programs the bias current of each read element in the tape head assembly 120. The bias programming outputs of the Ibias DAC 290 are provided to respective multiplexers 230, which drive the bias programming outputs to one of read signals 205 and 210 for biasing read elements in one of arrays A and B, respectively. In some implementations, programming of the read element bias current may occur at the factory after manufacture of the tape drive and while the system is being tuned for proper operation. In other implementations, programming of the read element bias current may occur during read/write tuning operation of the tape drive when the tape drive is first powered on by a user or otherwise requested by the user during operation of the tape drive.

A status compensator 292 monitors for various tape drive conditions, such as read element resistance, read element temperature, or thermal asperity occurrence. Information pertaining to such conditions is received from the multiplexers 230, which may in turn be instructed to counteract error conditions pertaining to the read elements of array A and array B.

Figure 3:
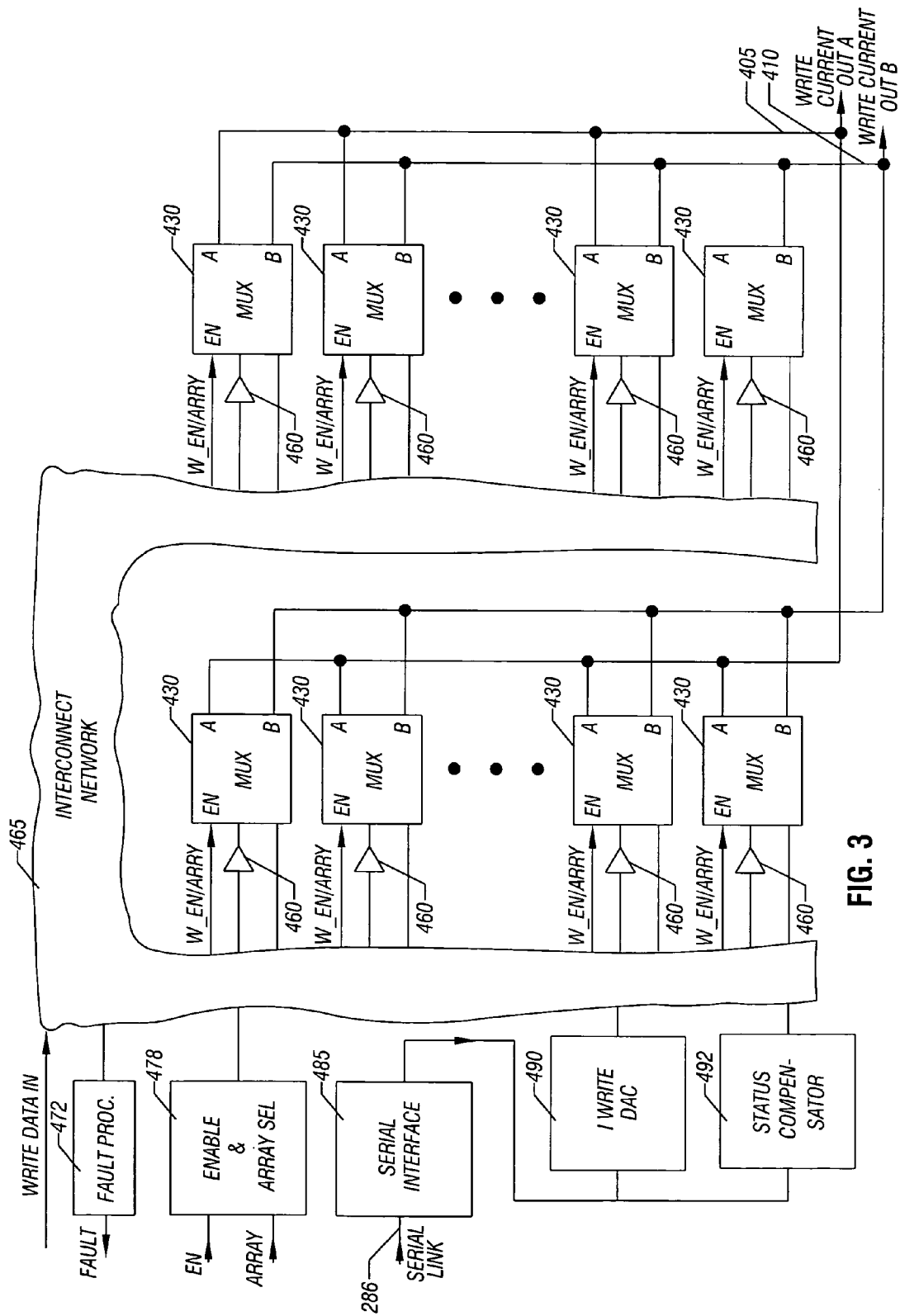
FIG. 3 is a schematic diagram of circuitry for providing write signals to write elements on the transducer head in the tape head assembly, according to one embodiment.

As shown in FIG. 3, the write circuitry 140 includes 16 multiplexers 430 that transmit 16 write signals 405 to array A write elements and 16 write signals 410 to array B write elements. The array A write signals 405 are provided by the A outputs of respective multiplexers 430, and the array B write signals 410 are provided by the B outputs of respective multiplexers 430. The magnitude of the write current provided is programmable such that varying requirements for the transducer head may be accommodated.

Write drivers 460 drive input write signals to respective inputs of the multiplexers 430. The input write signals (driven by respective drivers 460) are connected to one of the A and B output of the multiplexers 430 based on the state of a W_EN/ARRY signal, which is generated by an enable and array select logic 478. The 16 write data inputs from the system controller or processor on the circuit board 105 are routed through an interconnect network 465 and converted to switched write current by respective drivers 460. Because the write drivers 460 are located on the interconnect structure 163 (FIG. 1), the interconnect network 465 includes traces on the interconnect structure 163 and transmission lines on the circuit board 105.

A serial interface 485 receives serial data and instructions over the serial link 286. In response to input control and data, the serial interface 485 programs the write current of each individual write element using an Iwrite DAC 490. The serial interface,485 also cooperates with logic 478 to communicate open-circuit or short-circuit component faults detected by a fault processor 472. The fault processor 472 receives notification of faults from each of the multiplexers 430. A status compensator 492 monitors for parameters of write elements on the transducer head 120.

By using the multiplexing circuitry depicted in FIGS. 2 and 3 according to some embodiments, the number of read amplifiers 260 and the number of write drivers 460 can be reduced in half. The reduction of the number of write drivers and read amplifiers has several potential benefits. A reduction in the number of write drivers and read amplifiers reduces complexity of the design of the write circuitry and read circuitry. Also, less space is occupied due to the reduction in the number of components. Moreover, the reduced number of write drivers and read amplifiers may enable more channels to be added to the tape head assembly 100 to further increase data transfer throughput.

A tape head assembly according to some embodiments of the invention includes a transducer head having plural arrays of transducing elements to write data to or read data from tape. The transducing elements include either write elements or read elements. Further, the tape head assembly includes a set of conditioning elements that are either write drivers or read amplifiers. Multiplexing circuitry selectively couples the conditioning elements (write drivers or read amplifiers) to one of the plural arrays of transducing elements (write elements or read elements). This multiplexing enables a reduction in the number of conditioning elements (write drivers or read amplifiers) that have to be provided in write circuitry or read circuitry, thereby saving space and enabling greater density of components.

Also, in accordance with some embodiments of the invention, the read circuitry and write circuitry are implemented as separate units to enable the write circuitry to be placed in closer proximity to the transducer head than the read circuitry. Such an arrangement may have the benefit of increased switching times for write signals as well as reduced crosstalk between write signals and read signals.

FIG. 4 illustrates an example tape drive 500 that incorporates the tape head assembly 100 according to some embodiments. The tape drive 500 is capable of receiving a cartridge 502, which in one example implementation is a single-reel cartridge. However, in other embodiments, other types of tape cartridges or cassettes can be used. Once the cartridge 502 is loaded in the tape drive 500, a tape 506 is pulled by a picker (not shown) in the tape drive from the cartridge 502. The tape 506 is provided around a tape guide 508, through the tape head assembly 100, and around tape guide 510 to a take-up reel 504 in the tape drive 500.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A tape head assembly comprising:
   a transducer head having plural arrays of transducing elements to record data to or read data from tape, the transducing elements comprising at least one of write elements and read elements;
   a set of conditioning elements, the conditioning elements comprising at least one of write drivers and read amplifiers; and
   multiplexing circuitry to selectively couple the conditioning elements to one of the plural arrays of the transducing elements,
   wherein the transducer head comprises a first number of read elements, and the set of conditioning elements comprises a second number of read amplifiers, the second number being less than the first number,
   the multiplexing circuitry to selectively couple one of first and second arrays of read elements to inputs of the read amplifiers.

2. The tape head assembly of claim 1, wherein the transducer head further comprises a first number of write elements in the plural arrays, and the set of conditioning elements further comprises a second number of write drivers, the second number being less than the first number, the tape head assembly further comprising
   second multiplexing circuitry to selectively couple outputs of the write drivers to one of the plural arrays of write elements.

3. The tape head assembly of claim 2, further comprising a first set of write signal lines electrically connected to a first array of write elements, and a second set of write signal lines electrically connected to a second array of write elements,
   the second multiplexing circuitry to selectively couple the outputs of the write drivers to one of the first and second sets of write signal lines.

4. The tape head assembly of claim 1, further comprising a first set of read signal lines electrically connected to the first array of read elements, and a second set of read signal lines electrically connected to the second array of read elements, the multiplexing circuitry to selectively couple one of the first and second sets of read signal lines to the inputs of the read amplifiers.

5. A tape head assembly comprising:
a transducer head having plural arrays of transducing elements to record data to or read data from tape, the transducing elements comprising write elements and read elements;
a set of conditioning elements, the conditioning elements comprising write drivers and read amplifiers; and
multiplexing circuitry to selectively couple the conditioning elements to one of the plural arrays of the transducing elements; and
write circuitry comprising the write drivers and read circuitry comprising the read amplifiers,
wherein the write circuitry and read circuitry are contained in separate units,
wherein the write circuitry is positioned in closer proximity to the transducer head than the read circuitry.

6. A tape head assembly comprising:
a transducer head having plural arrays of transducing elements to record data to or read data from tape, the transducing elements comprising at least one of write elements and read elements;
a set of conditioning elements, the conditioning elements comprising at least one of write drivers and read amplifiers;
multiplexing circuitry to selectively couple the conditioning elements to one of the plural arrays of the transducing elements,
wherein the multiplexing circuitry comprises multiplexers controllable by one or more control signals to select which one of the plural arrays of transducing elements to couple to the conditioning elements; and
a module to set a bias current of each of the transducing elements, the module to set the bias current through the multiplexers.

7. A tape head assembly comprising:
a transducer head having plural arrays of transducing elements to record data to or read data from tape, the transducing elements comprising at least one of write elements and read elements;
a set of conditioning elements, the conditioning elements comprising at least one of write drivers and read amplifiers;
multiplexing circuitry to selectively couple the conditioning elements to one of the plural arrays of the transducing elements,
wherein the multiplexing circuitry comprises multiplexers controllable by one or more control signals to select which one of the plural arrays of transducing elements to couple to the conditioning elements; and
a module to detect a parameter associated with each of the transducing elements, the module to receive information relating to the parameter through the multiplexers.

8. A tape drive comprising:
a circuit board; and
a tape head assembly, comprising:
a transducer head;
read circuitry mounted on the circuit board;
an interconnect structure to electrically connect the transducer head to the read circuitry; and
write circuitry mounted on the interconnect structure and electrically connected to the transducer head,
wherein the write circuitry is in closer proximity to the transducer head than the read circuitry.

9. The tape drive of claim 8, wherein the interconnect structure comprises a flexible circuit.

10. A tape drive comprising:
a circuit board; and
a tape head assembly, comprising:
a transducer head;
read circuitry mounted on the circuit board;
an interconnect structure to electrically connect the transducer head to the read circuitry; and
write circuitry mounted on the interconnect structure and electrically connected to the transducer head,
wherein the transducer head has plural sets of write elements to record data to tape, and plural sets of read elements to read data from tape,
wherein the write circuitry comprises write drivers and multiplexing circuitry to selectively couple outputs of the write drivers to one of the plural sets of write elements, and
wherein the read circuitry comprises read amplifiers and multiplexing circuitry to selectively couple one of the plural sets of read elements to inputs of the read amplifiers.

11. The tape drive of claim 10, wherein the transducer head has a first number of write elements, and the write circuitry has a second number of write drivers, the second number being less than the first number.

12. The tape drive of claim 11, wherein the second number is half the first number.

13. The tape drive of claim 10, wherein the transducer head has a first number of read elements, and the read circuitry has a second number of read amplifiers, the second number being less than the first number.

14. The tape drive of claim 13, wherein the second number is half the first number.

15. A method of accessing data on tape, comprising:
receiving plural sets of read signals from respective plural arrays of read elements on a transducer head; and
providing the plural sets of read signals to multiplexing circuitry to select one of the plural sets of read signals to couple to inputs of a set of read amplifiers.

16. The method of claim 15, further comprising:
providing plural sets of write signals to respective plural arrays of write elements on the transducer head, and
providing outputs of a set of write drivers to second multiplexing circuitry, the multiplexing circuitry selecting which one of the plural sets of write signals to connect to the outputs of write drivers.

17. The method of claim 16, wherein the write drivers are part of write circuitry, and the read amplifiers are part of read circuitry, the method further comprising:
positioning the write circuitry in closer proximity to the transducer head than the read circuitry.

18. The method of claim 17, further comprising:
communicating the read and write signals over an interconnect structure coupled to a circuit board;
mounting the read circuitry on the circuit board; and
mounting the write circuitry on the interconnect structure.

19. The method of claim 15, wherein the transducer head has a first number of read elements, and wherein the plural sets of read signals are provided to the multiplexing circuitry to select one of the plural sets of read signals to couple to inputs of the set of a second number of read amplifiers, the second number being less than the first number.

* * * * *